Figure 4:
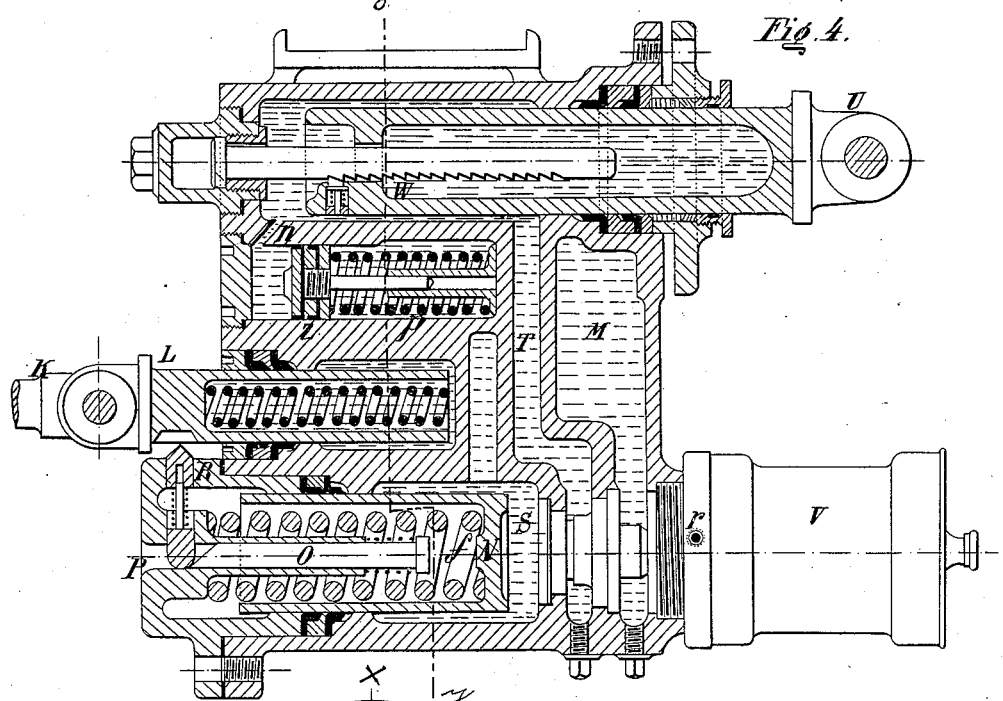

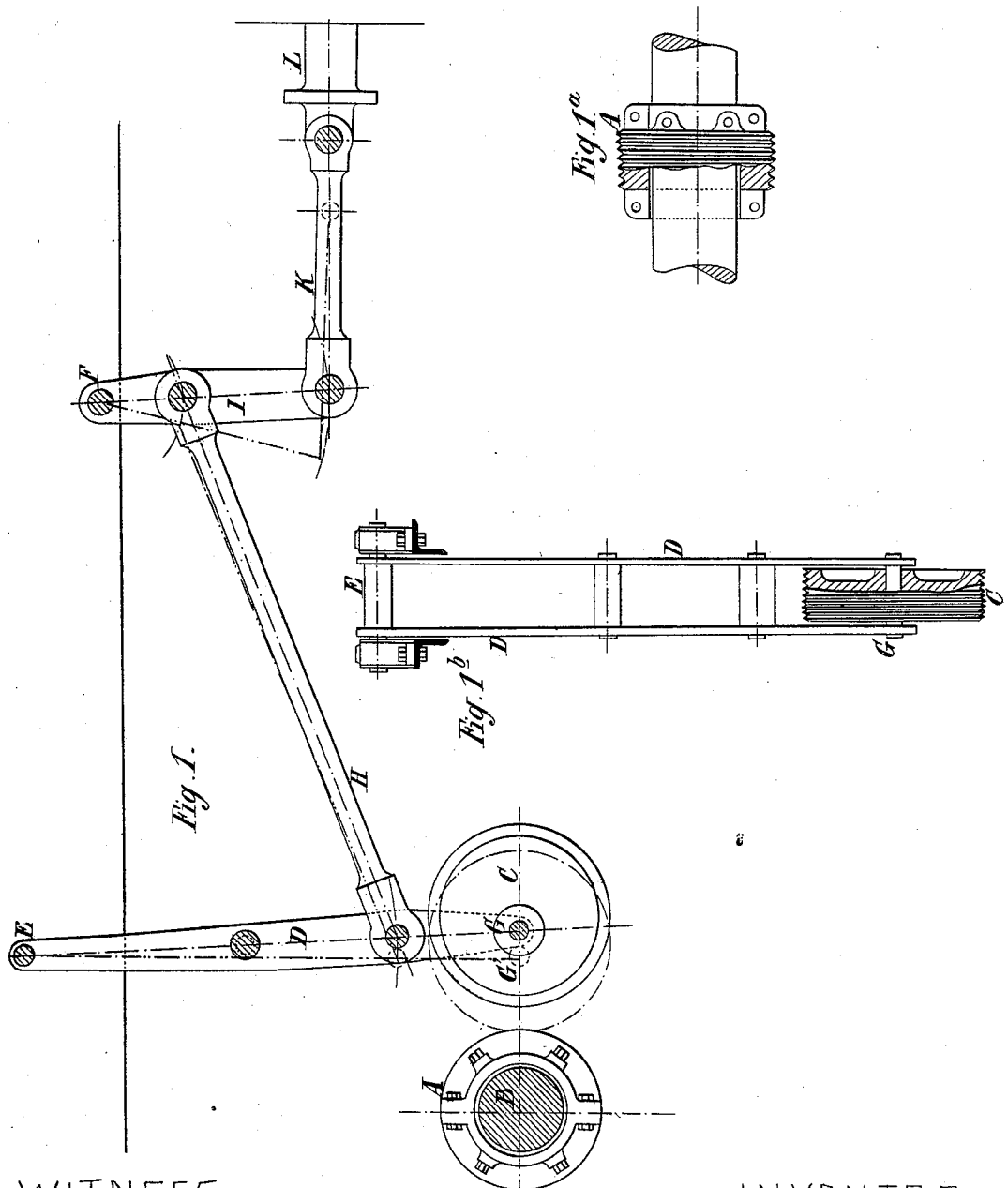

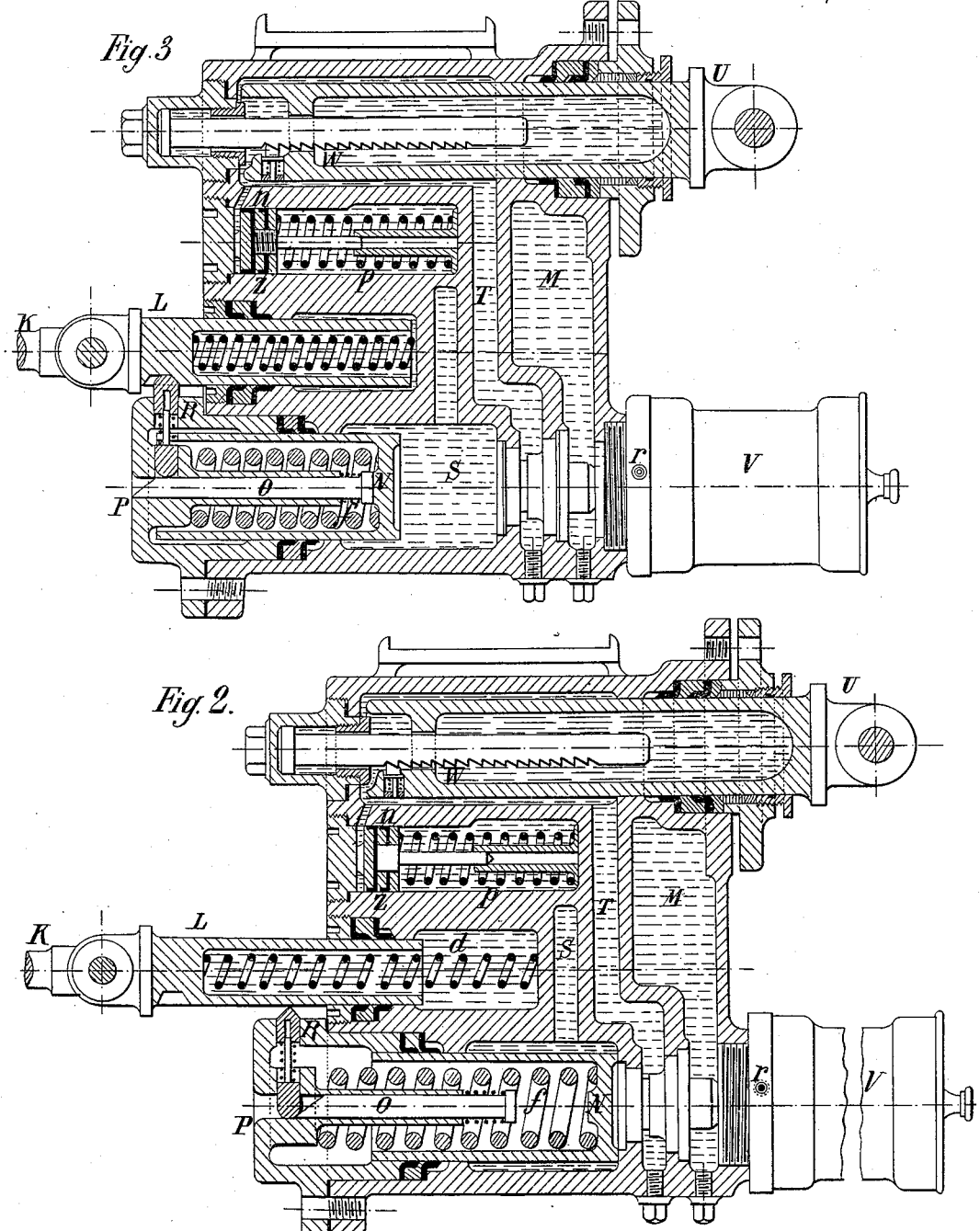

(No Model.) 5 Sheets—Sheet 3.

C. DUREY.
BRAKE APPARATUS FOR RAILWAY VEHICLES.

No. 585,089. Patented June 22, 1897.

WITNESS
H. Richard Köbse
Otto Munk

INVENTOR
Camille Durey
by Richardson
Attys (No Model.) 5 Sheets—Sheet 4.
C. DUREY.
BRAKE APPARATUS FOR RAILWAY VEHICLES.
No. 585,089. Patented June 22, 1897.
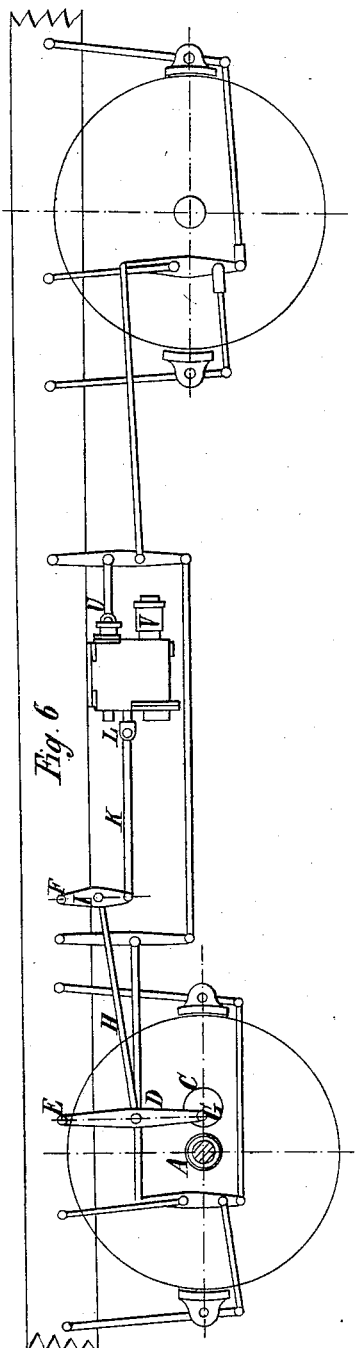
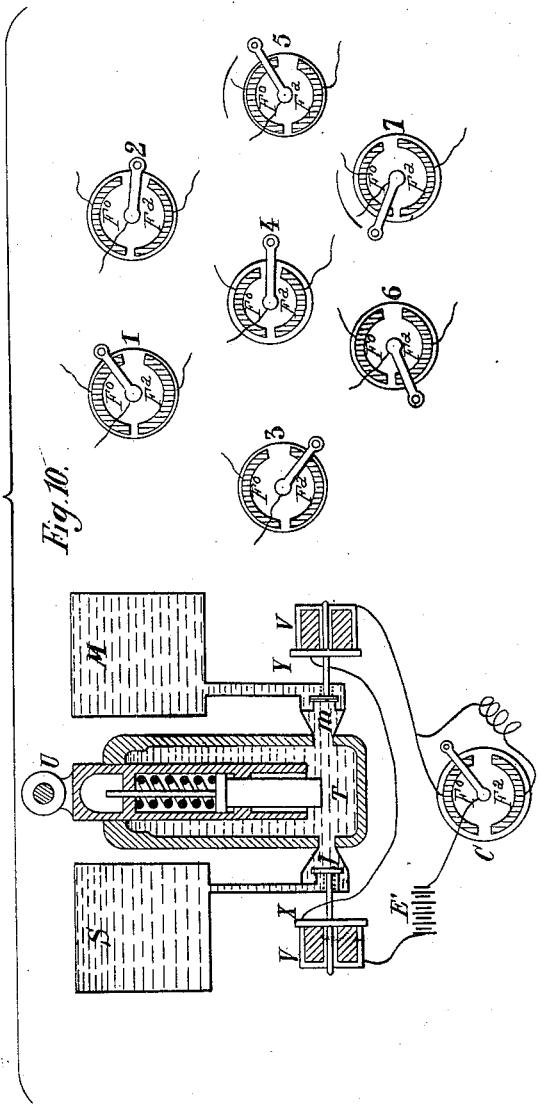
WITNESS
H. Richard Nöbse
Otto Munk
INVENTOR
Camille Durey
by Richards
Att'ys (No Model.)
5 Sheets—Sheet 5.

C. DUREY.
BRAKE APPARATUS FOR RAILWAY VEHICLES.

No. 585,089.  Patented June 22, 1897.

WITNESS  INVENTOR
Camille Durey

UNITED STATES PATENT OFFICE.

CAMILLE DUREY, OF PARIS, FRANCE.

BRAKE APPARATUS FOR RAILWAY-VEHICLES.

SPECIFICATION forming part of Letters Patent No. 585,089, dated June 22, 1897.

Application filed November 28, 1896. Serial No. 613,722. (No model.)

*To all whom it may concern:*

Be it known that I, CAMILLE DUREY, of Paris, France, have invented certain new and useful Improvements in Brake Apparatus for Railway-Vehicles, of which the following is a full, clear, and exact description.

The operation of braking consists, essentially, in applying brake-blocks to the tires of the wheels, by means of rigging which is actuated by the brake apparatus proper, with a force that should be capable of being varied at will according to requirements. It is thus necessary in every brake to have at disposal, first, a permanent force; second, gear for regularly transmitting this force to the brake-blocks. In the majority of brakes at present employed this force is taken from a single source of power extraneous to the vehicles to be braked, and as soon as this source disappears the brake apparatus becomes inoperative. It is thus not possible to make an isolated vehicle, and a vehicle forming part of a group of vehicles connected to the source of power (a complete train) is completely at the mercy of the permanence of the said source. Now in electrohydraulic brake apparatus, according to this invention, on the contrary, the moving vehicle takes the force necessary for its braking automatically and when requisite from its own *vis viva* or momentum. This autonomy thus enables an isolated vehicle to be braked and also insures the braking of a moving train irrespectively of the number of vehicles of which it is composed.

General Principle of the Electrohydraulic Brake.

As above stated, the momentum of the vehicle constitutes the source whence the energy necessary for braking the vehicle is taken automatically and when required. For this purpose the vehicle is fitted with a small hydraulic accumulator forming part of the brake and always maintained automatically under pressure by the operation (which is also automatic) of parts which receive the momentum, which move automatically when as a result of the consumption of liquid or of leakage the pressure in the accumulator is no longer at the predetermined normal maximum, and which automatically go out of operation when the said normal pressure is reached. There is thus placed at the disposal of the braking a permanent hydraulic power that is capable of acting on a brake-piston which directly actuates the rigging.

In the normal running of the train an electric current is employed to work simultaneously the brakes of all the vehicles of the train. This current acts in various ways according to its strength, which is regulated by means of a simply-manipulated switch for applying the brakes, moderating their action, and releasing the brakes.

Braking and increasing the braking action are effected by the permanent or momentary interruption of the current, which causes a part of the liquid to pass from the accumulator into the brake-cylinder.

The reduction of the brake-pressure and the complete release of the brakes are produced, on the contrary, by the reëstablishment of the current, which causes a part of the liquid under pressure contained in the brake-cylinder to return into a reservoir under atmospheric pressure when the accumulator is supplied.

In the case of an isolated vehicle mechanical means are employed in the place of the electric current for the same purpose.

My electrohydraulic brake thus carries out in an advantageous manner the very complicated functions required of brakes, viz: continuity, because my brake can be applied to the whole of any number of vehicles composing one and the same train and connected together by a single electrical controlling device; simultaneous and instantaneous operation on all the vehicles, which is a result of the electrical controlling device and its constant readiness to operate; automatic action of the brake in case of interruption of the current; moderability, by applying at will to the piston of the brake any pressure that may be necessary, from zero up to the maximum.

Characteristic Features of the Electrohydraulic Brake.

The special features of this brake are therefore, first, the automatic utilization of the momentum of the moving vehicle, irrespective of the direction of such motion, when and only when such utilization is necessary for the purpose of charging a hydraulic accumulator; second, the automatic charging, to a predetermined normal maximum pressure, and the maintenance at the said pressure, of a hydraulic accumulator in such a manner as to keep a permanent hydraulic pressure at the disposal of the braking devices; third, the distribution of this hydraulic pressure to the braking apparatus by means of electric controlling apparatus employing a current of variable strength regulated by a switch for the purpose of effecting at will and instantaneously all braking operatives; fourth, the possibility, in the absence of the electric current and by means of mechanical devices in lieu thereof, of braking an isolated vehicle with the same power; fifth, the faculty, by means of the said mechanical devices, of paralyzing the action of a brake of a vehicle forming part of a train without interfering with the operation of the others; sixth, an internal arrangement for automatically compensating for the wear of the brake-blocks.

*Description of the Electrohydraulic Brake.*

My electrohydraulic brake comprises two distinct parts united in one apparatus.

First part: Devices for taking the force and for transmitting the same to a hydraulic accumulator (where the energy is stored) at the normal maximum pressure, with apparatus for controlling the automatic operation of the said devices, so as to secure the permanency of the power by means of an immediate automatic compensation for losses of the charge of the accumulator.

Second part: Devices for utilizing the permanent power for braking purposes with controlling apparatus, which latter may be worked either electrically by means of a switch or mechanically by special parts arranged for that purpose.

Figure 5:
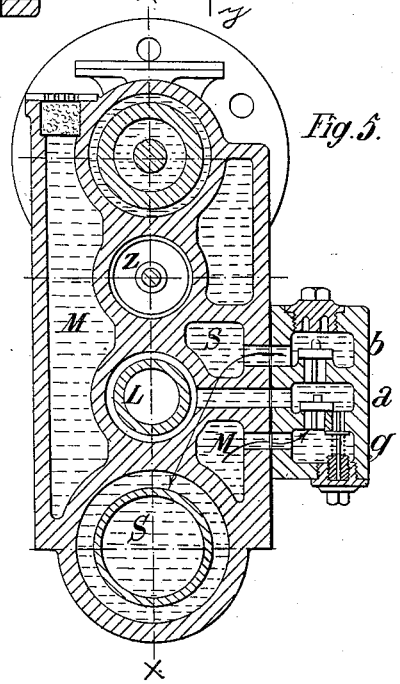
Figure 7:
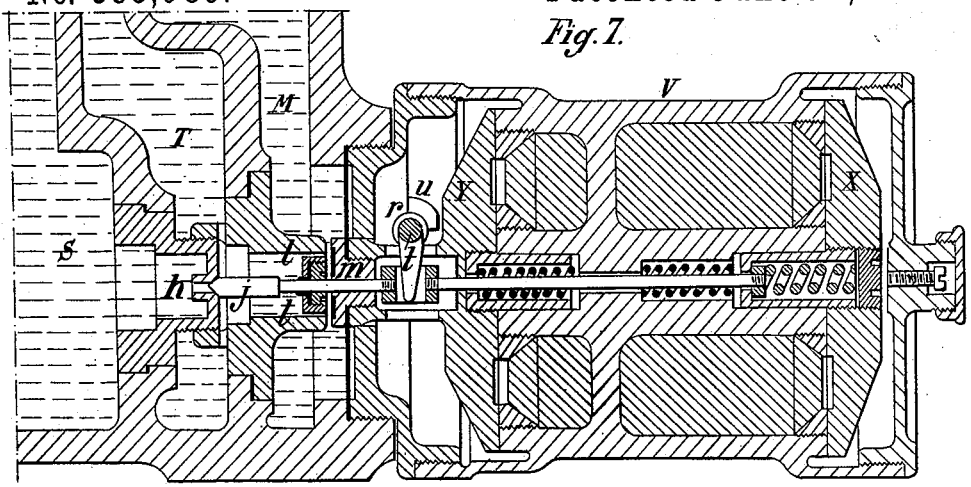
Figure 8:
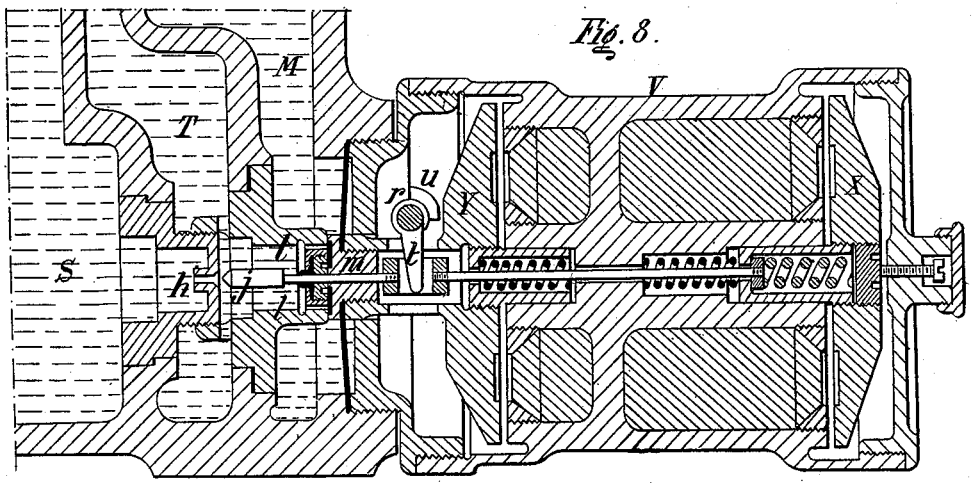
Figure 9:
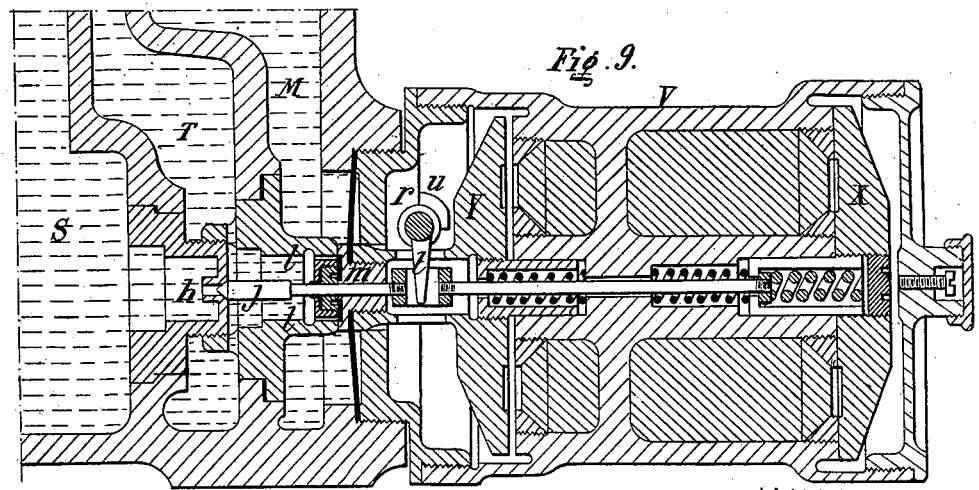

Figure 1 of the accompanying drawings illustrates the mode of connection between the brake and the axle of the vehicle. Fig. 1ª shows in detail the sleeve A, mounted on the axle of the vehicle. Fig. 1ᵇ is a side elevation of the roller C and its support. Figs. 2, 3, and 4 show longitudinal sections taken along the axis of the pump-piston and the accumulator-piston on line $x\,x$ of Fig. 5. Fig. 5 shows a cross-section on line $y\,y$ of Fig. 4. Fig. 6 illustrates the application of the brake apparatus to a railway-vehicle and the mode of connecting the same to the blocks of the wheels. Figs. 7, 8, and 9 show cross-sections taken along the axis of the electromagnet, also on line $x\,x$ of Fig. 5. Fig. 10 illustrates diagrammatically the different phases of the operation of the apparatus.

I. *Taking the Power—Hydraulic Accumulator.*

*Arrangement for automatic charging*, Figs. 1, 2, 3, and 4.—The power-taking device consists substantially of a sleeve A, made in two parts for convenience of erection and keyed centrally on one of the axles B of the vehicle. It is provided with circular saw-tooth grooves in such a manner as to constitute one element of a wedge friction-clutch, Figs. 1 and 1ª. The number of the grooves of the sleeve may vary according to the nature of the metal employed. The other element of this clutch, situated opposite thereto and forming the counterpart of the sleeve A, is a circular roller C, also provided with grooves and mounted eccentrically on an axle G at the end of a connecting-rod D, capable of turning about its axis of suspension E, fixed to the framing of the vehicle. This roller is weighted or balanced in such a manner that when at rest its longest radius is never directed toward the sleeve.

To the connecting-rod D is fixed a rod H, ending in a multiplying-lever I, which, suspended from its axis F, actuates, through a connecting-rod K, the piston L of the pump for charging the accumulator. This arrangement enables this piston to have a longer stroke than would be the case if the stroke were produced directly by the necessarily short stroke or travel of the axle of the roller, Figs. 1 and 1ᵇ. The said pump, Figs. 2, 3, 4, and 5, is single acting, and when it is working it draws in liquid by way of a valve $a$, Fig. 5, in the free-air vessel M and subsequently forces the said liquid by way of a valve $b$ into the cylinder of the accumulator S behind a piston N, constantly acted upon by a spring $f$, whose stress determines the pressure in the accumulator and which has a constant tendency to move the piston back up against the end of its cylinder. In cold countries the liquid used should be a nonfreezing liquid.

A spring $d$, acting upon the pump-piston L, tends to cause it to move out of its barrel, while a bolt R, by engaging with its nose in a groove in the piston L, Fig. 3, counteracts the action of the spring $d$ and keeps the piston at the inner end of its barrel. The bolt R is composed of two parts separated by a spring, and it is caused to engage by means of a bolt O, which slides in the cap P of the accumulator and is provided with a spring having a tendency to cause it to move back. The bolt O is carried forward when the inner end of the piston N touches its end, and, by means of the inclined plane at its other end, raises the lower end of the bolt R and thereby compresses the internal spring in the latter, so that the nose of the bolt R, being pushed by the said spring, will be ready to engage in the groove of the piston L when the said groove comes in front of it during the reëntering movement of the said piston.

A small safety-valve $g$ placed in communication with the delivery-passage of the pump is set beforehand to a pressure slightly greater than the normal maximum pressure which it is desired to reach, and it allows the liquid in excess to flow into the reservoir M.

*Automatic Charging of the Accumulator.*

The effect of the arrangement of the above-described parts is that as soon as the pressure in the accumulator varies from the normal maximum pressure the said parts enter automatically into operation in the following manner: The piston N of the accumulator being moved to a certain extent into its cylinder, Fig. 4, by the action of its spring $f$, as soon as liquid has been withdrawn from the accumulator ceases to bear against the bolt O, which is then moved back by its spring, so as to release the other bolt R, which moves down and releases the piston L. The latter, under the action of its spring $d$, moves outward in its barrel and draws in water behind it, carrying with it the small brake-linkwork K I H D, and moves the roller C into contact with the sleeve A. As the latter revolves with the axle it carries around with it by contact the roller C, whose eccentricity produces a to-and-fro movement of its axis from G' to G, and consequently also a to-and-fro movement of the pump-piston L—that is to say, it causes the said pump to operate and to force liquid into the accumulator, compressing the spring $f$ of the accumulator-piston, Figs. 1, 2, and 4.

In practice the ratio of the diameters of the pump-piston and the accumulator-piston is made such that a very small number of pump-strokes will be sufficient for charging the accumulator. When the latter has reached the predetermined normal maximum pressure, the end of its piston N will have carried along with it the bolt O, and consequently the spring of the bolt R will have been cocked in such a manner that as soon as in its rearward stroke the notch in the piston L comes opposite the nose of the bolt R the latter will become engaged and arrest the piston, Fig. 3, and consequently the roller C will be kept out of contact with the sleeve A.

The safety-valve allows of the discharge to the reservoir M of the excess of liquid when, the accumulator-piston N having reached the end of its stroke, the pump-piston L has still a certain distance to move through before its notch will come opposite to the bolt R, that serves to arrest it. Thus there is an automatic stoppage of the parts for charging the accumulator when the latter has reached its normal maximum pressure, and there is an automatic restarting of the said parts as soon as the accumulator-pressure has become diminished for the purpose of restoring such pressure to the said maximum. Thus a part of the momentum of the moving vehicle is converted automatically and when required into a permanent hydraulic pressure, which is kept constantly at the disposal of the brakes and is utilized as hereinafter described.

II. *Brake-Piston—Regulator—Arrangement for Distributing the Liquid under Pressure.*

*Electric controlling or operating arrangement*, Figs. 2, 3, 4, 6, 7, 8, 9, and 10.—A brake-piston U acts upon the blocks through the medium of connecting mechanism of any suitable arrangement, as shown in Fig. 6. Its cylinder communicates, first, with a passage T for the supply or the discharge of liquid according to the operation of the distributing-valves, and, second, with one end of another cylinder in which moves a regulating-piston Z, behind which there acts a spring $p$, calculated to become compressed to a certain extent when the piston U and consequently the piston Z are subjected to the maximum pressure. The passage T can communicate with the chamber S of the accumulator by means of the orifice $h$, provided with a valve $j$, Figs. 7, 8, and 9. It can also communicate by means of an orifice $l$, provided with a valve $m$, with the discharge-reservoir M, which is in communication with the atmosphere and from which the compressing-pump takes its supply. The valves $j$ and $m$ are each connected to one of the two armatures of an electromagnet V, having two windings into which can pass an electric current whose intensity can be made small or great at will through the means of a switch. The valve $j$ is closed by the weak or strong current. The valve $m$ is closed by a spring in the absence of current or with the weak current; it is opened by the strong current.

Any suitable system of springs or of counterweights determines the reëntrance of the brake-piston U into its cylinder when it is not subjected to any pressure of the liquid.

*Manipulation and Operation of the Brake.*

As the braking consists in causing to act on the brake-piston U as rapidly as possible, a pressure that is more or less considerable and can vary from zero to the maximum, according to requirements, what is to be done is to cause the brake-cylinder at will and during the necessary time to communicate at one time for applying the brakes with the accumulator under permanent pressure and at another time for release with the discharge-reservoir M.

It is to be assumed that the apparatus is filled with liquid in all the parts that ought to contain it. This liquid should be as uncongealable as possible—for example, a naphtha, which, having at the same time the advantage of being a lubricant for the working parts, appears as if it ought to be employed by preference.

It results from the arrangement of the parts hereinbefore described that the simple manipulation of a switch adapted to interrupt the electric current or to send at will a current, either weak or strong, into the electromagnet V enables all the operations necessary to the braking to be performed. It will be easy to understand this from the diagram Fig. 10, if it be observed that the operation of the valves takes place as indicated by the following table:

Strong current...... { Valve $j$ closed. Valve $m$ open.

Weak current....... { Valve $j$ closed. Valve $m$ closed.

Absence of current.. { Valve $j$ open. Valve $m$ closed.

In Fig. 10, U represents the brake-piston mounted in the passage T, which communicates, on the one hand, with the chamber S of the accumulator (where there is always liquid under pressure) by way of the valve $j$ and, on the other hand, with the reservoir M, containing liquid at the atmospheric pressure, by way of the valve $m$. The valves $j$ and $m$ are respectively connected to the electromagnet V, in communication with the source of electricity E', and the switch C'.

With the parts in the position shown in 1 the strong current F° is passing. $j$ is then closed and $m$ open, and the brake is off. This is the position corresponding to the normal running of the train.

2 indicates the position corresponding to momentary rupture of the current. $j$ is then open and $m$ closed. This is the position in case of putting on the brakes.

3 indicates the establishment of the weak current F$^a$. $j$ and $m$ are then closed. With this position the brake-shoes are kept applied at the desired pressure.

4 indicates definite rupture of the current. $j$ is open and $m$ closed. There is maximum application.

5 indicates momentary reëstablishment of the strong current F°. $j$ is then closed and $m$ open. The brakes are being released.

6 indicates the establishment of the weak current F$^a$. $j$ and $m$ are then closed. There is arrest of the release and maintenance of the desired pressure.

7 indicates positive reëstablishment of the strong current F°. $j$ is then closed and $m$ open. This is the position of the full release and consequently that of normal running of the train 1.

*Normal travel of the train—Brake at rest.*—The position 1 of the switch (strong current) indicates that the valve $j$ is closed and the valve $m$ open. The latter, which establishes the discharge from the brake-cylinders to the reservoir, being open, it follows that if through any cause whatever the valve $j$ should leak there could not, notwithstanding that, be an untimely application of the brake.

*Application.*—The position 2 of the switch (rupture of the current) indicates that the valve $j$ is open and the valve $m$ closed. There is then escape of liquid from the accumulator S to the brake-cylinders through the passage T, and consequently application of the brake. This application increases until the communication between S and T is interrupted by closing the valve $j$, as in the position 3.

*Maintenance of the application at a desired pressure.*—The position 3 (weak current) indicates that $j$ is closed and $m$ also closed, so that the pressure obtained at this moment is maintained on the brake-piston because there is escape neither on one side nor on the other.

*Increase of the application.*—In order to increase the application, one returns momentarily to the position 2, (rupture of the current,) which opens the valve $j$ and closes the valve $m$. In order to maintain the new degree of application obtained, the position 3, with which the two valves $j$ and $m$ are closed, is restored.

*Maximum application.*—This is obtained by the definite rupture of the current by means of the position 4, with the valve $j$ open and the valve $m$ closed. The result is an equilibrium of pressure between the accumulator and the brake-cylinder. The compression-pump, being automatically put into operation as soon as the pressure has lowered in the accumulator, will bring back this common pressure to the regulation maximum, producing the maximum application. This is the automatic braking in the case of ruptures of draw-gear.

*Diminution of application.*—This is produced by a momentary reëstablishment of the strong current, the switch being brought into the position 5, with which, the valve $j$ being closed and the valve $m$ open, (as with the position 1,) the liquid can escape from the brake-cylinder to the reservoir M. The taking off increases until, through the reëstablishment of the weak current by the assumption of the position 6, (like the position 3,) the two valves $j$ and $m$ are closed at one time, which arrests the taking off and maintains it at the degree obtained.

*Full release.*—This is obtained by the definite reëstablishment of the current, the switch being brought into the position 7, (like the position 1,) which, bringing about the closing of the valve $j$ and the opening of the valve $m$, puts the brake-cylinder into constant communication with the reservoir M. We are now brought back to the case of the normal travel of the train, (brake at rest.)

To recapitulate, one can by maintaining the strong current, maintaining the weak current, breaking the current, passing from strong current or from weak current to rupture, and passing from strong current to weak current, and vice versa, obtain at will absolutely all the operations necessary to braking, and that with the greatest rapidity, by the simple manipulation of a switch.

*Moderability of the application.*—The moderability of the application is transmitted to the shoes in a most perfect manner on account of the action of the regulating-piston Z. This piston enables liquid to be received from the accumulator or to be discharged to the reservoir at the same time that it communicates integrally to the brake-piston the pressure resulting from the degree of compression of its spring, and that without the cessation of the maintenance of the contact of the shoes with the wheels, since the brake-piston U does not reënter into its cylinder while it is subjected to a sensible pressure under the action of the liquid pressed by the piston Z, on which acts the spring $p$.

*Braking an isolated vehicle.*—An isolated vehicle can be braked by hand without the aid of electricity. In fact, when there is no electric current the distributing-valves are naturally in the position that corresponds to the application of the brake, Fig. 8, and the latter will operate as if the vehicle formed part of a train.

In order to take off and suspend the action of the brake, it is sufficient to close the valve $j$ and open the valve $m$. For this purpose in front of the armature Y and of the electromagnet V, Fig. 7, there is arranged a small shaft $r$, on which is fixed a small arm $t$, carrying a boss or cam $u$. This arm $t$ passes into an opening on the rod of the valve $j$, while the boss or cam is opposite to the armature Y. If then by means of a handle or lever the shaft $r$ be turned to a certain extent in the clockwise sense, the arm $t$ will keep the valve $j$ closed, while the boss or cam $u$, bearing the armature Y, will open the valve $m$. The lever or handle for operating the shaft $r$ being maintained in this position by any means whatever, which may be varied according to the nature of the vehicle, the isolated vehicle will then be able to travel freely without the aid of electricity. The vehicle can be braked anew at will by replacing the lever or the handle into the position that leaves free the operation of the valve $j$ and the armature Y, for then $j$ will be opened and $m$ closed, which corresponds again to Fig. 8.

My electrohydraulic brake, in consequence of the autonomy of each vehicle, thus renders it practicable to obtain the very important result of braking at will an isolated vehicle without the aid of electricity and by substituting for the action of the latter the simple manipulation of mechanical parts.

With the other systems of brakes that owe their power of action to a force extraneous to the vehicle the latter when it is isolated, and consequently deprived of this action, is necessarily not in a condition to be braked when the employment of its brake would be of prime importance for operations in stations, shunting, making up trains, and the like.

*Rendering inoperative the brake of a vehicle forming part of a train.*—This operation may be rendered necessary by an irregularity in the braking of a vehicle forming part of a train. It is necessary, therefore, to paralyze the brake of that vehicle without injury to the operation of the others. It will be sufficient to effect the manipulation described above for releasing the brake of an isolated vehicle, Fig. 7, by closing the valve $j$ and opening the valve $m$ in order to paralyze the operation of this brake, even under the action of the electric actuating apparatus, without injuring in any way whatever the operation of the brakes of the other vehicles of the train.

*Automatic compensation for the wear of the brake-shoes.*—The electrohydraulic brake is provided with a device adapted to compensate automatically for the wear of the shoes by maintaining their distance from the wheels as invariable as possible in the taken-off position, which, by reducing this distance, enables one to apply the brake to any degree whatever in the shortest time possible. For this purpose (see Figs. 2, 3, and 4) the brake-piston U is furnished with a bolt $w$, with inclined plane and contact-spring in gear with a rack whose teeth are formed by transverse cuts in a cylinder and which is parallel to the axis of the said cylinder. This rack can only be carried along longitudinally by the bolt $w$, and its course, limited by that of its head between two abutments, corresponds to the normal distance between the brake-shoes and the wheels after release.

The two extreme positions of the rack are those indicated in Figs. 2 and 4. In consequence of this device the distance between the brake-shoes and the wheels is a minimum and practically constant, for if as a result of wear the increase of this distances comes to be greater than that corresponding to the pitch of the teeth of the rack the piston U, during a stroke of the brake, will continue its course, but the rack, which will first have been carried along, will be already stopped at the end of its course and the bolt $w$ will advance on it by one tooth. It results from this that in returning the piston U will reenter to the same extent less into its cylinder, because its limited course is determined by the rear abutment of the rack and the position of the bolt $w$ on the latter, the form of the teeth of the rack permitting the bolt to travel only forward on it. If, for example, the pitch of the rack be that corresponding to a millimeter of wear for the shoes, the distance between the brake-shoes and the wheels will be constant, at least, within one millimeter. This arrangement has besides the very great advantage that as soon as the brake is released after its first application the brake-blocks will be all automatically brought to their proper distance from the wheels if by chance they had not been adjusted in this respect beforehand.

*Replacing worn brake-shoes.*—From what has been said it will be seen that when the brake-shoes have been completely worn away the bolt $w$ will have arrived at the extremity of the rack. If then it be desired to replace the shoes by new ones, it will be necessary to return the piston U to the inner end of its cylinder, and consequently to bring the bolt $w$ back to the beginning of the rack, as shown in Fig. 2. For this purpose it is sufficient after disengaging the head of the piston U from the rigging to cause this piston to make a half-revolution about its axis, so that the bolt *w* will be at a smooth portion of the cylinder, and consequently nothing will any longer prevent the piston from moving backward. When this operation has been effected, all that is necessary in order to cause the bolt to reëngage with the rack is to give the piston another new half-turn, whereupon after coupling the piston to the connecting mechanism all will be restored to the initial position. (Shown in Fig. 2.)

Having now particularly described and ascertained the nature of the said invention and in what manner the same is to be performed, I declare that what I claim is—

1. In combination, the brake-operating cylinder, and piston, the reservoir, the pump, the piston having a recess near its outer end, means for reciprocating said piston, a spring-detent comprising two parts movable toward and from each other with an interposed spring, one of said parts being adapted to engage the notch in the piston, and the incline operated by the pressure in the reservoir and adapted to bear against the other part of the spring-detent to compress the spring, substantially as described.

2. In combination, the brake cylinder and piston, the reservoir comprising the cylinder and spring-pressed piston, the pump-cylinder arranged parallel to said reservoir, the pump-piston with means for operating it, the pin adapted to enter a recess in the pump-piston at the inward limit of its stroke, the spring-pressed slide operated by the movement of the reservoir-piston at the limit of its outward stroke, the pin adapted to be operated by said slide, and the spring located between said pins, substantially as described.

3. In combination, the brake cylinder and piston, the closed regulating-cylinder in communication therewith and having a spring-pressed piston, the reservoir for supplying fluid under pressure to the brake-cylinder, and the pump for supplying fluid to the reservoir, substantially as described.

4. In combination, the brake cylinder and piston, the regulating-cylinder having a spring-pressed piston and arranged to receive the excess of pressure from brake-cylinder, the storage-reservoir for fluid under pressure having a spring-pressed piston, the pump cylinder and piston, all of said cylinders being parallel with each other, and the reservoir for fluid not under pressure partially surrounding said cylinders, substantially as described.

5. In combination, the brake cylinder and piston, the pressure-reservoir for supplying fluid under pressure thereto, the reservoir for fluid not under pressure in communication with said brake-cylinder, the pump for transferring the fluid from the reservoir not under pressure to the pressure-reservoir, valves controlling the passage of the fluid between the reservoirs and the brake-cylinder, said valves being in line with each other, the electromagnet and armature for operating one valve, and the second electromagnet and armature for operating the second valve, said magnets and armatures being in line and the stem of the second valve passing through the first valve and its armature, substantially as described.

In testimony whereof I have signed my name to this specification in the presence of two subscribing witnesses.

CAMILLE DUREY.

Witnesses:
EMILY BERT,
S. MOSTICKER.